US008215052B2

(12) United States Patent
Cink

(10) Patent No.: US 8,215,052 B2
(45) Date of Patent: Jul. 10, 2012

(54) PEST CONTROL SYSTEM AND METHOD

(75) Inventor: James H. Cink, Ballwin, MO (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 13/162,236

(22) Filed: Jun. 16, 2011

(65) Prior Publication Data

US 2011/0239528 A1 Oct. 6, 2011

Related U.S. Application Data

(62) Division of application No. 12/126,742, filed on May 23, 2008, now Pat. No. 7,987,630.

(51) Int. Cl.
*A01M 17/00* (2006.01)
*A01M 1/02* (2006.01)
*A01M 1/20* (2006.01)
(52) U.S. Cl. ........................... 43/132.1; 43/131
(58) Field of Classification Search .................. 43/132.1, 43/124, 131
See application file for complete search history.

(56) References Cited

U.S. PATENT DOCUMENTS

| | | | | |
|---|---|---|---|---|
| 3,835,578 | A * | 9/1974 | Basile ........................... | 43/132.1 |
| 3,940,875 | A * | 3/1976 | Basile ........................... | 43/132.1 |
| 4,043,073 | A * | 8/1977 | Basile ........................... | 43/132.1 |
| 4,160,335 | A * | 7/1979 | Von Kohorn et al. ........... | 43/131 |
| 4,269,820 | A * | 5/1981 | Davies et al. .................. | 43/131 |
| 4,639,393 | A * | 1/1987 | Von Kohorn et al. ......... | 43/132.1 |
| 4,666,767 | A * | 5/1987 | Von Kohorn et al. ......... | 43/132.1 |
| 4,983,390 | A * | 1/1991 | Levy .............................. | 424/405 |
| D324,792 | S | 3/1992 | McElroy | |
| 5,329,726 | A * | 7/1994 | Thorne et al. .................... | 43/131 |
| 5,594,076 | A * | 1/1997 | Gordon et al. ............... | 43/44.98 |
| 5,698,210 | A * | 12/1997 | Levy .............................. | 424/406 |
| 5,877,422 | A * | 3/1999 | Otomo .......................... | 43/132.1 |
| 5,921,018 | A * | 7/1999 | Hirose et al. ................. | 43/132.1 |
| 5,950,356 | A | 9/1999 | Nimocks | |

(Continued)

FOREIGN PATENT DOCUMENTS

JP 4335851 11/1992

(Continued)

OTHER PUBLICATIONS

International Search Report and Written Opinion for PCT/US2009/044602, dated Aug. 12, 2009; 9 pages.

*Primary Examiner* — Darren W Ark
(74) *Attorney, Agent, or Firm* — Armstrong Teasdale LLP

(57) ABSTRACT

In a system and method for at least one of monitoring and controlling pests, a container having an interior chamber, is located in an area in which pests are to be at least one of monitored and controlled. At least a portion of the container is constructed of an environmentally degradable plastic. At least one of a pest monitoring material and a pest bait material is disposed within the interior chamber of the container for at least one of monitoring and controlling pests. The container is inspected at least once prior to the end of a predetermined time period to determine whether pests are present within the container. The container is replaced, along with the at least one of the monitoring material and the bait material, no later than about six months beyond the predetermined period of time following placement of the container in the area.

3 Claims, 8 Drawing Sheets

U.S. PATENT DOCUMENTS

| | | | |
|---|---|---|---|
| 5,953,855 A * | 9/1999 | Edwards | 43/132.1 |
| 6,003,266 A * | 12/1999 | Woodruff | 43/131 |
| 6,004,572 A * | 12/1999 | Harvan et al. | 424/420 |
| 6,016,625 A * | 1/2000 | Bishoff et al. | 43/132.1 |
| 6,195,934 B1 * | 3/2001 | Megargle et al. | 43/132.1 |
| 6,202,342 B1 * | 3/2001 | Edwards | 43/132.1 |
| 6,205,701 B1 | 3/2001 | Nimocks, III | |
| 6,264,968 B1 * | 7/2001 | Anderson et al. | 424/405 |
| 6,337,079 B1 * | 1/2002 | Maindron | 424/408 |
| 6,346,262 B1 * | 2/2002 | Levy | 43/131 |
| D457,591 S | 5/2002 | Christianson et al. | |
| 6,397,516 B1 * | 6/2002 | Su | 43/132.1 |
| 6,416,752 B1 | 7/2002 | Richardson et al. | |
| 6,439,069 B1 | 8/2002 | Cates | |
| 6,543,182 B2 | 4/2003 | Snell et al. | |
| 6,612,068 B1 | 9/2003 | Aesch, Jr. | |
| 6,631,583 B2 | 10/2003 | Rollins | |
| D484,562 S | 12/2003 | Casteel et al. | |
| 6,772,557 B2 * | 8/2004 | Laskey et al. | 43/124 |
| D498,812 S | 11/2004 | Warner | |
| 6,857,223 B2 * | 2/2005 | Su | 43/131 |
| 7,052,631 B2 * | 5/2006 | Cranor | 43/17.6 |
| 7,076,914 B1 * | 7/2006 | Howse | 43/132.1 |
| 7,086,196 B2 | 8/2006 | Cink et al. | |
| 7,093,389 B1 | 8/2006 | Meier et al. | |
| 7,169,403 B2 * | 1/2007 | Su | 43/132.1 |
| 7,335,374 B2 * | 2/2008 | Voris et al. | 424/411 |
| 7,434,351 B2 * | 10/2008 | Bette | 43/131 |
| 7,987,630 B2 * | 8/2011 | Cink | 43/132.1 |
| 2001/0023552 A1 | 9/2001 | Fujimoto | |
| 2002/0144453 A1 * | 10/2002 | Su | 43/124 |
| 2004/0074138 A1 * | 4/2004 | Moreira | 43/107 |
| 2004/0079025 A1 * | 4/2004 | Snell et al. | 43/131 |
| 2005/0112163 A1 * | 5/2005 | Nishimura et al. | 43/132.1 |
| 2005/0122163 A1 | 6/2005 | Chu | |
| 2005/0166446 A1 * | 8/2005 | Middlebrook et al. | 43/131 |
| 2005/0284017 A1 * | 12/2005 | Kongshaug | 43/132.1 |
| 2006/0042154 A1 | 3/2006 | Rich et al. | |
| 2006/0201053 A1 * | 9/2006 | Voris et al. | 43/124 |
| 2006/0254123 A1 * | 11/2006 | Su | 43/132.1 |
| 2006/0275335 A1 * | 12/2006 | McKernan et al. | 424/405 |
| 2007/0256350 A1 * | 11/2007 | Cates | 43/132.1 |
| 2008/0233080 A1 * | 9/2008 | Perrott et al. | 43/58 |
| 2008/0268190 A1 * | 10/2008 | Shi et al. | 428/35.5 |
| 2009/0047236 A1 * | 2/2009 | Stamets | 424/84 |
| 2009/0084024 A1 * | 4/2009 | Hamilton Baxter | 43/131 |
| 2009/0094884 A1 * | 4/2009 | Cink | 43/132.1 |
| 2010/0120308 A1 * | 5/2010 | Shi | 442/1 |
| 2010/0212213 A1 * | 8/2010 | Hope et al. | 43/131 |

FOREIGN PATENT DOCUMENTS

| | | | |
|---|---|---|---|
| JP | 04335851 A * | 11/1992 | |
| JP | 5095751 | 4/1993 | |
| JP | 05095751 A * | 4/1993 | |
| JP | 6116103 | 4/1994 | |
| JP | 06116103 A * | 4/1994 | |
| JP | 9224541 | 9/1997 | |
| JP | 09224541 A * | 9/1997 | |
| JP | 10179000 | 7/1998 | |
| JP | 2002315493 | 10/2002 | |
| JP | 2007075045 | 3/2007 | |
| JP | 2007075045 A * | 3/2007 | |
| WO | 9102024 | 2/1991 | |

* cited by examiner

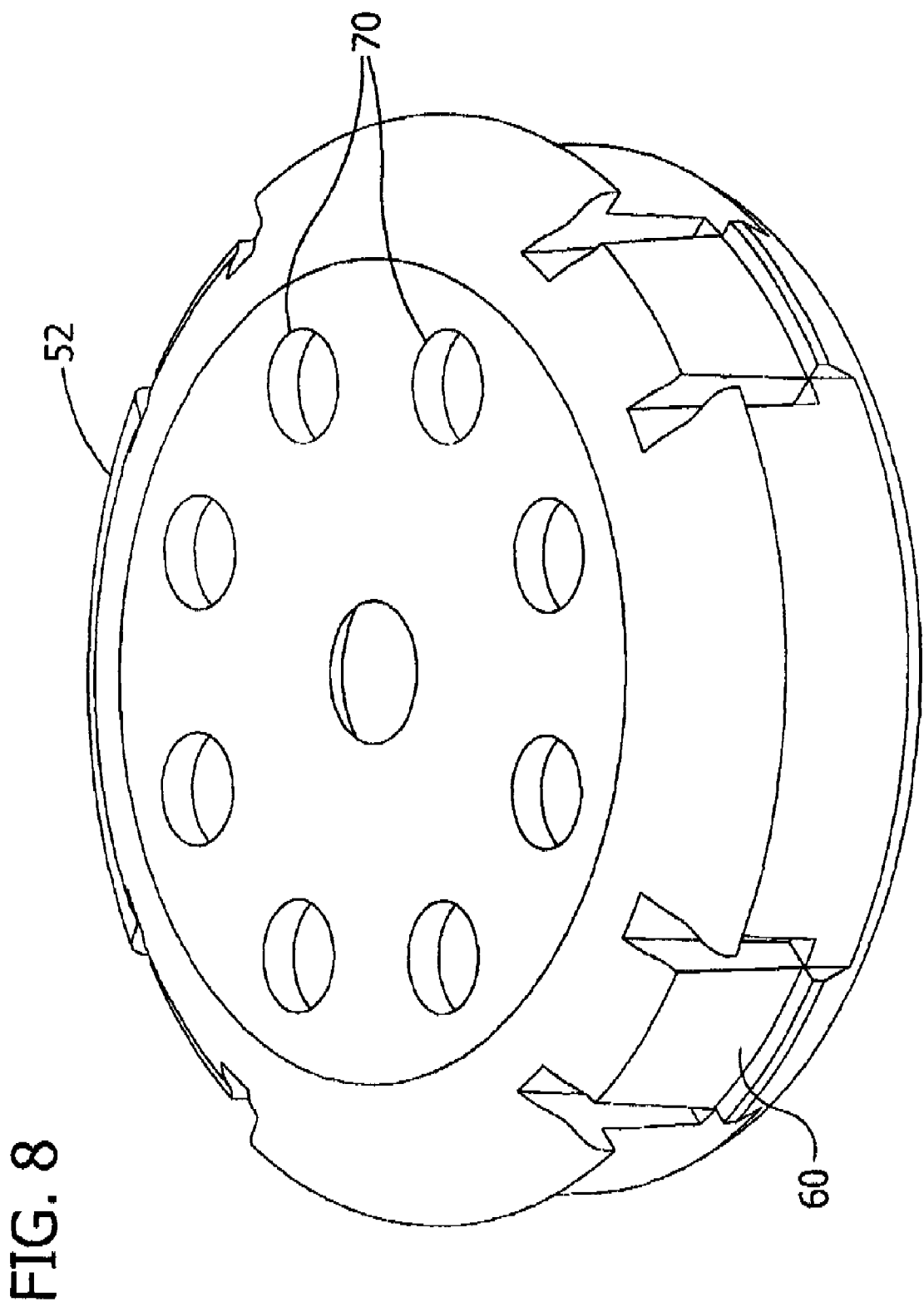

PEST CONTROL SYSTEM AND METHOD

CROSS-REFERENCE TO RELATED APPLICATIONS

This application is a divisional application of U.S. patent application Ser. No. 12/126,742, filed May 23, 2008 (now U.S. Pat. No. 7,987,630), the entirety of which is herein incorporated by reference.

BACKGROUND OF THE INVENTION

This invention generally relates to a pest control system, and more particularly to such a system that is at least in part environmentally degradable.

Many pests, such as but not limited to termites, are serious threats throughout much of the world to structures or other objects containing wood or other cellulose containing components because these pests consume cellulose for nutrition. Subterranean termites, which typically dwell in the soil, often form large colonies. Members of the colony forage for food and thus burrow galleries or passageways in the soil outwardly from the nest. Portions of the food located by the foraging termites are returned to the nest. Termites are also known to possess means for communicating the location of a food source to other termites within the colony.

Many pest control systems are known and formed in a wide variety of configurations to monitor and eradicate the pests. One type of popular termite control system, for example, utilizes a monitoring food source made from a medium that is attractive to termites to encourage the termites to begin feeding from the device. The termites are then eliminated by providing a toxicant-containing bait material placed at the feeding point in the termite control system. Perhaps most important, termite baiting results in the elimination or suppression of the entire termite colony, not just the members of the colony that reach the system site, because the toxicant-containing bait is brought to the nest with the returning termites. Because a termite bait must be consumed by termites in order to be effective, a technique must be developed to consistently and repeatedly make the bait available for consumption by members of a termite colony at a fixed point over a long enough period of time for the bait to have the intended toxic effect on the colony.

Typically, the toxic termite bait is applied only after contact has been established with a termite colony and termites are feeding from the system. Reasons for this include minimization of the amount of bait used, potential deterioration of bait if it is left in place for long periods of time in anticipation of prospective termite attack, minimization of the potential for unintended exposure of children and pets to the bait, etc. Therefore, it is preferable to first detect termites at the bait holder with a nontoxic medium while monitoring the site. After termites are detected, the toxic bait is applied to the bait holder.

Such systems must be inspected periodically, such as every one to three months, to determine whether termites are active within the bait holder. However, to accomplish this, a baiting system must deal with several issues that, left unresolved, make a baiting method and/or system less likely to succeed. For example, when inspecting the monitoring medium or the bait within the bait holder or when adding or replacing the toxic bait, the feeding site is typically disturbed. This may cause the termites to abandon the bait holder altogether. Additionally, when a monitoring material or bait is left in place for a relatively long period without replacement, its useful life (e.g., efficacy or otherwise its ability to perform as intended) is diminished. Thus, there is a need for a pest control system for monitoring and/or controlling pests in which the system encourages replacement of the monitoring material and/or bait once the useful life thereof has ended or is substantially diminished.

SUMMARY

In one embodiment, a system for at least one of monitoring and controlling pests generally comprises a container having an interior chamber, wherein at least a portion of the container is constructed of an environmentally degradable plastic. At least one of a pest monitoring material and a pest bait material is disposed within the interior chamber of the container for at least one of monitoring and controlling pests.

A method for at least one of monitoring and controlling pests, according to one embodiment, generally comprises locating a container, having an internal chamber, in an area in which pests are to be at least one of monitored and controlled. At least a portion of the container is constructed from an environmentally degradable plastic constructed to be degraded at least about 50 percent by the end of a predetermined period of time following placement of the container in the area. The container contains at least one of a monitoring material and a bait material within its internal chamber. The container is inspected at least once prior to the end of the predetermined time period to determine whether pests are present within the container. The container is replaced, along with the at least one of the monitoring material and the bait material, no later than about six months beyond the predetermined period of time following placement of the container in the area.

In another embodiment, a method of making a system for at least one of monitoring and controlling pests generally comprises constructing a container at least in part of an environmentally degradable plastic constructed to be degraded at least about 50 percent by the end of a predetermined period of time following exposure of the container to the environment. The container is loaded with at least one of a pest monitoring material and a pest bait material.

In one embodiment of a pest control system maintenance method, the pest control system generally comprises a system housing located in an predetermined area, and a container having a bait material therein and being insertable into and removeable from the system housing. At least a portion of the container is constructed of an environmentally degradable plastic. The bait material has a predetermined useful life following placement of the container into the system housing. The method generally comprises inserting the container, with bait material therein, into the system housing to initiate an environmental degradation schedule for the container and recording the date on which the container is inserted into the container. The container is intermittently inspected to determine whether the bait material needs replacement due to the bait material being reduced by pests. The container is replaced, with bait material therein, with a new container, with new bait material therein, upon determining that the bait material needs replacement due to the bait material being reduced by pests. The container and bait material is replaced with a new container and bait material if intermittent inspection does not result in replacement due to the bait material being reduced by pests and the container degrading a predetermined amount. The container and bait material are replaced with a new container and bait material if intermittent inspection does not result in replacement due to the bait material being reduced by pests and a time period within about six months of the predetermined useful life of the bait material has passed.

Other objects and features will be in part apparent and in part pointed out hereinafter.

BRIEF DESCRIPTION OF THE DRAWINGS

FIG. 8 is a perspective of a lid portion of the monitoring container of FIG. 4.

Corresponding reference characters indicate corresponding parts throughout the several views of the drawings.

DETAILED DESCRIPTION OF THE INVENTION

Figure 1:
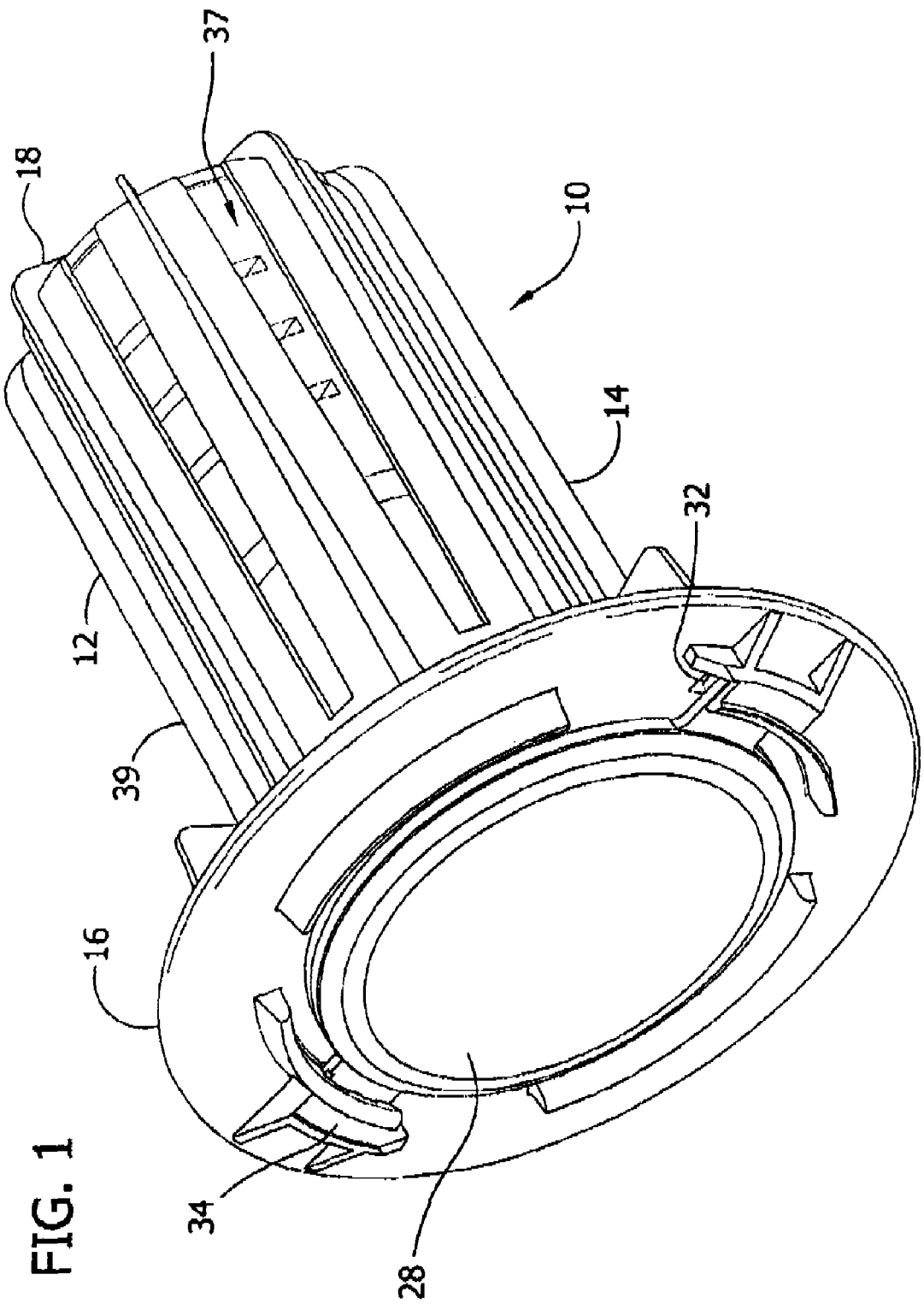
FIG. 1 is a perspective of one an embodiment of a pest control system.
Figure 2:
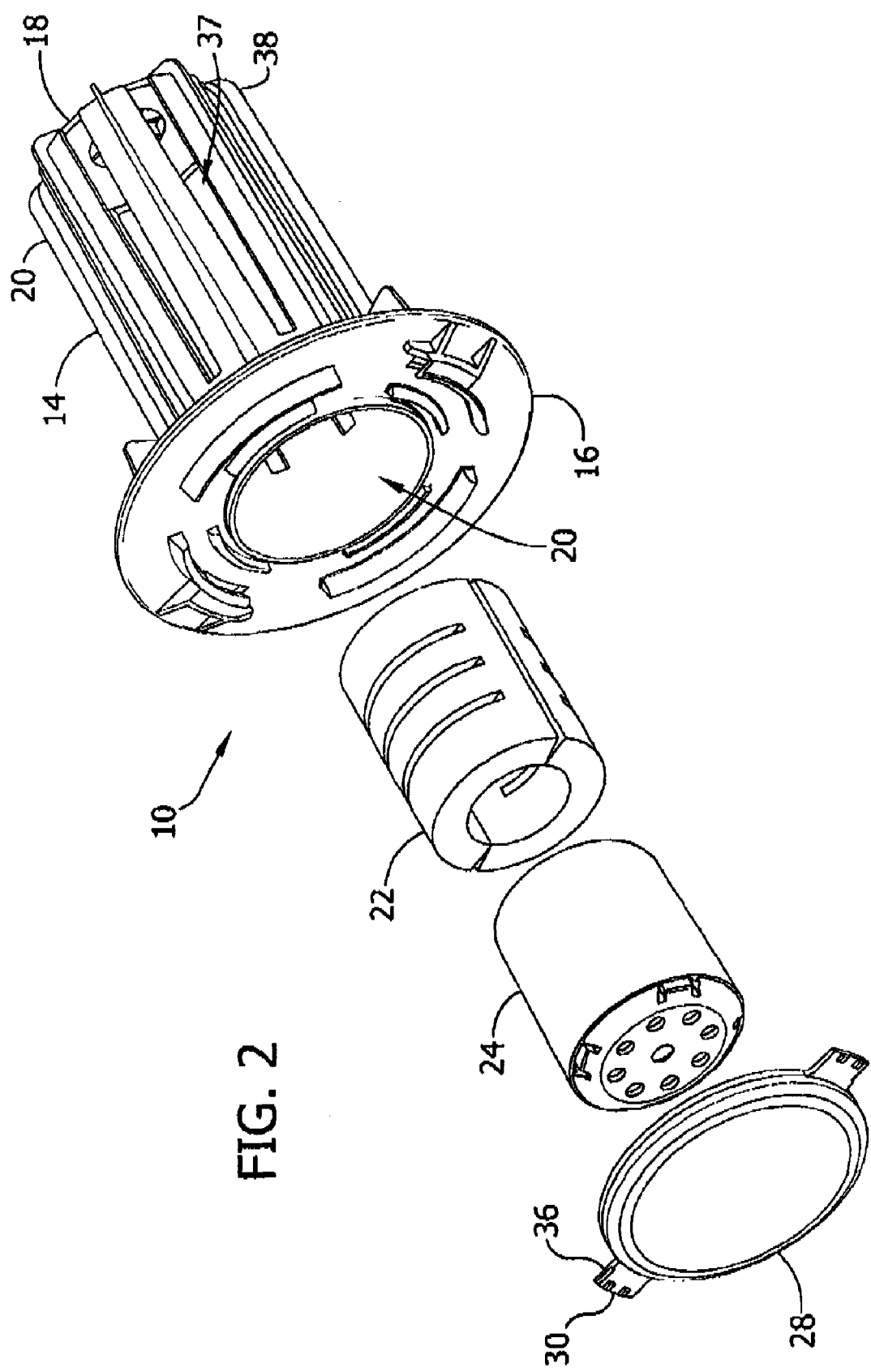
FIG. 2 is an exploded perspective of the pest control system of FIG. 1.

With reference now to the drawings and in particular to FIGS. 1 and 2, a pest monitoring and/or control system according to one embodiment is generally indicated at 10. Although the illustrated system 10 is particularly suitable for monitoring and/or controlling termites, it is contemplated that the system may be used to monitor and/or control ants and/or other pests. As best illustrated in the exploded view of FIG. 2, the system 10 comprises a substantially hollow housing 12 having a generally annular side wall 14, a top surface 16 and a bottom surface 18 defining an interior space 20 of the housing. A portion of the top surface 16 of the housing 12 is open for loading and accessing one or more of an aggregation base 22, a monitoring container 24 and/or a bait container 25 (not shown but described below with reference to FIG. 5) within the interior space 20 of the housing.

A cap 28 is configured for removeable securement to the top surface 16 to generally close the housing 12 against removal of the aggregation base 22, monitoring container 24 and/or bait container 25 therefrom. As one example, in the illustrated embodiment the cap 28 has a pair of tabs 30 that extend into slots 32 in the top surface 16 of the housing 12. The cap 28 is then rotated either counter clockwise or clockwise to engage the cap 28. The tabs include a chamfer 34 along a leading edge 36 of the tab 30. As the cap 28 rotates into position, the chamfer 34 helps guide the tab 30 into position within the slot 32. Other suitable means for securing the cap 28 to the top surface 16 may be used, however, without departing from the scope of this invention.

Although shown as having a generally cylindrical shape, the housing 12 may be any other suitable shape, such as rectangular. As one example of suitable dimensions of system housing 12, the system may have a maximum height of less than about 18 inches (457 mm) and a maximum diameter or width of less than about 12 inches (305 mm). In another embodiment the system housing 12 has a maximum height of less than about 9 inches (229 mm) and a maximum width of less than about 4 inches (102 mm). It is understood, though that the size of the system housing 12 may be larger or smaller than as set forth above.

The housing 12 has at least one opening 37 passing through the side wall 14 to permit the ingress and egress of termites into and out of the interior volume 20 of system 10. For example, in the illustrated embodiment the side wall 14 has several vertical elongate openings 37 (e.g., slots) therein extending a substantial length and more suitably substantially the entire length of the side wall. As used herewith, the term vertical is used in reference to one suitable orientation of the system 10 with the top surface 16 of the housing 12 facing in an upward direction, such as where the system is placed in the ground with the bottom 18 of the housing below the ground surface and the top surface of the housing flush with or lying against the ground surface. It is contemplated however, that other shapes and orientations for the openings 37 may be used. For example, the openings 37 in the housing 12 may be horizontal elongate openings, or may be circular openings randomly placed or formed in a repeating pattern. Additionally, there may be openings 37 in the bottom surface 18 leading to the interior space 20 of the housing 12. In an alternate embodiment, the openings 37 are formed only in a lower portion 38 of the side wall 14 of the housing 12 such that an upper portion 39 of the side wall 14 near the top surface 16 of the housing 12 is imperforate.

In use, the system 10 is at least partially received within a cavity accessible to termites, while still being accessible above ground by a user. The cavity may be a subterranean cavity, or may be a cavity within a wall or other framework of a building or other above ground structure. The cavity may be formed in the soil, or the cavity may be formed in a paving material, such as concrete or asphalt, with soil beneath the paving material. Preferably, the system 10 is substantially entirely received within the cavity such that only the top surface 16 and cap 28 are accessible from above ground. However, in some situations, the system 10 may be nearly entirely on top of the ground, such as where the cavity is very shallow.

In one embodiment, such as that illustrated in FIG. 2, the aggregation base 22 is received within the interior space 20 of the housing 12 such that it is positioned adjacent the lower portion 38 of the side wall 14 so that the elongate openings 37 expose the aggregation base 22 to the subterranean cavity. The monitoring container 24 or the bait container 25 is then received within the interior space 20 of the housing 12 so as to be received adjacent to the aggregation base 22. It is also contemplated that the aggregation base may be formed as a tube and the replaceable monitoring container 24 or bait container 25 sized and configured to be received within the hollow interior of such a tube.

Alternatively, the aggregation base 22 may be located directly within the cavity (e.g., without the housing 12). For example, when the aggregation base 22 is to be used in a more durable environment where there is little possibility that side walls of the cavity will collapse around the aggregation base 22, such as, for example, in paving material, the aggregation base 22 can be placed directly into the cavity. The monitoring container 24 or the bait container 25 then may be positioned directly in the cavity adjacent to, and more suitably directly above, the aggregation base 22. In such an embodiment, there is no need for a system housing 12 to receive the aggregation base 22 and the containers 24, 25. A suitable cap, the various possible constructions of which are known in the art, may then be placed over the cavity to secure the aggregation base 22 and containers 24 and/or 25 within the cavity. However, in the above embodiments, the aggregation base 22 is suitably located in the cavity or system housing 12 in a substantially stationary manner so that there is minimal disturbance to the aggregation site and the termites while the containers 24 and/or 25 are being inspected, removed and/or replaced.

Figure 3:
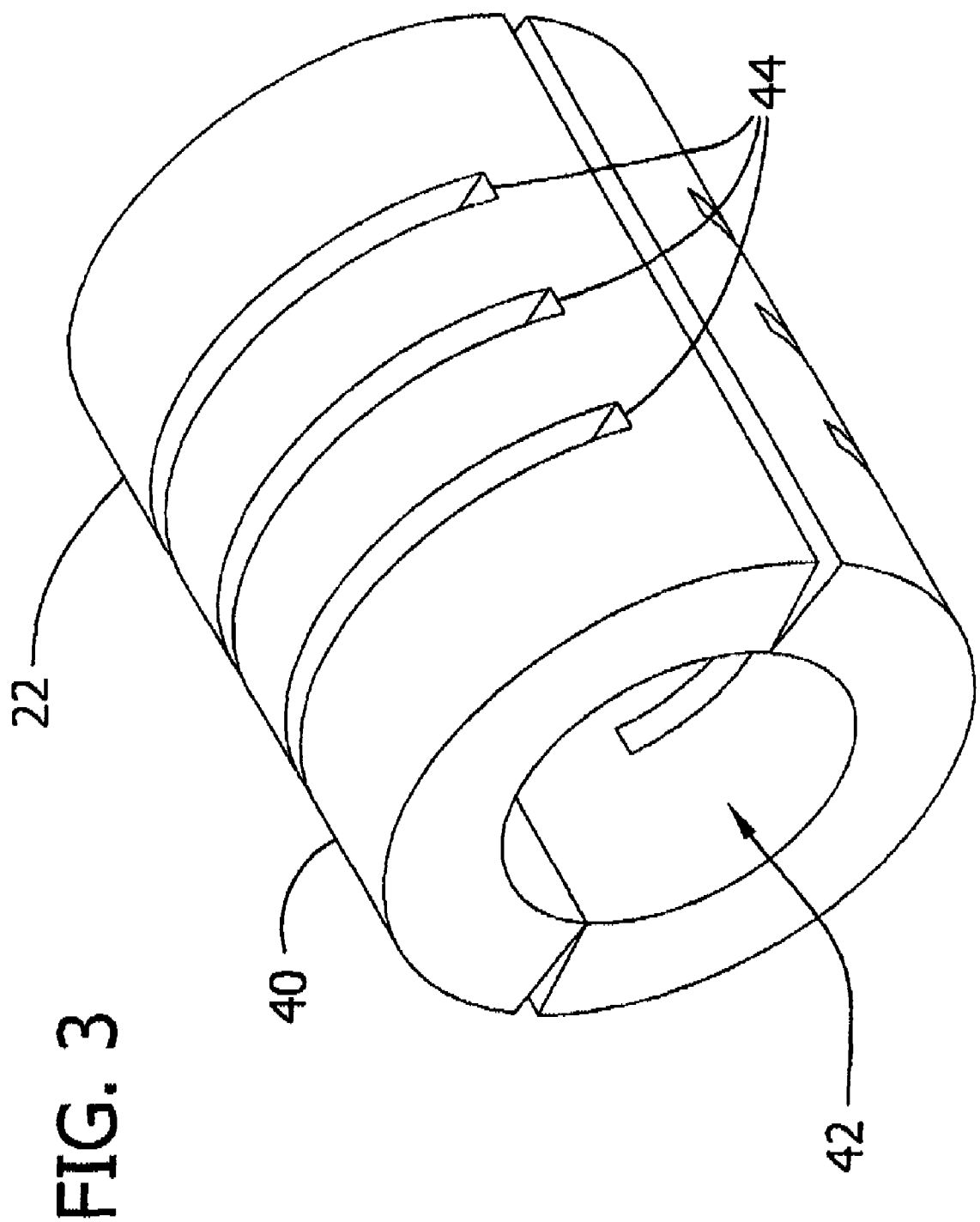
FIG. 3 is a perspective of an aggregation base used with the pest control system of FIG. 1.

FIG. 3 illustrates an embodiment of the aggregation base 22. In the illustrated example, the aggregation base is formed in a generally cylindrical shape such that an outer surface 40 of the aggregation base faces the interior of the sidewall 14 of the system housing 12 or cavity when placed in service. Other versions of the aggregation base 22 may have different geometric shapes suitable for use depending on the cavity or housing 12 into which the base is received. In an embodiment of the aggregation base 22 to be received within the interior space 20 of the housing 10, it is suitable that the aggregation base 22 have a shape similar to the shape of the housing 12 with a transverse cross-sectional dimension (e.g., width or diameter) slightly less than an inner transverse cross-sectional dimension of the housing 12 so that the aggregation base 22 may be removably received in a snug fitting relationship within the housing 12. Suitably, in one embodiment the aggregation base 22 has a void 42 as illustrated in FIG. 3 substantially centrally located within the aggregation base 22 which is suitable for an aggregation site for termites. The illustrated aggregation base 22 suitably also has channels 44 formed therein and passing through the aggregation base 22 from the outer surface 40 inward to the void 42. These channels 44 guide termites from the outer surface 40 to the aggregation site in the void 42 of the aggregation base 22. In one particularly suitable embodiment the aggregation base 22 is made from a cellulosic material attractive to termites, such as wood.

Alternatively, or additionally, the aggregation base 22 may be made of plastic or other suitable material and filled with cellulosic material, such as paper, cardboard, compressed tablets, or other suitable feeding material and may have holes providing access to the feeding material. In such an embodiment, the aggregation base 22 may be similar in construction to the container 24 as described in further detail later herein. In other embodiments the aggregation base may be made from a foam material. It is contemplated that the aggregation base 22 may not have a void space free of material, as long as the base is suitably configured so that termites feeding on the aggregation base or material within the aggregation base will form an aggregation site within the base. In other embodiments of the system 10 it is contemplated that the aggregation base 22 may be omitted from the system without departing from the scope of this invention.

Figure 4:
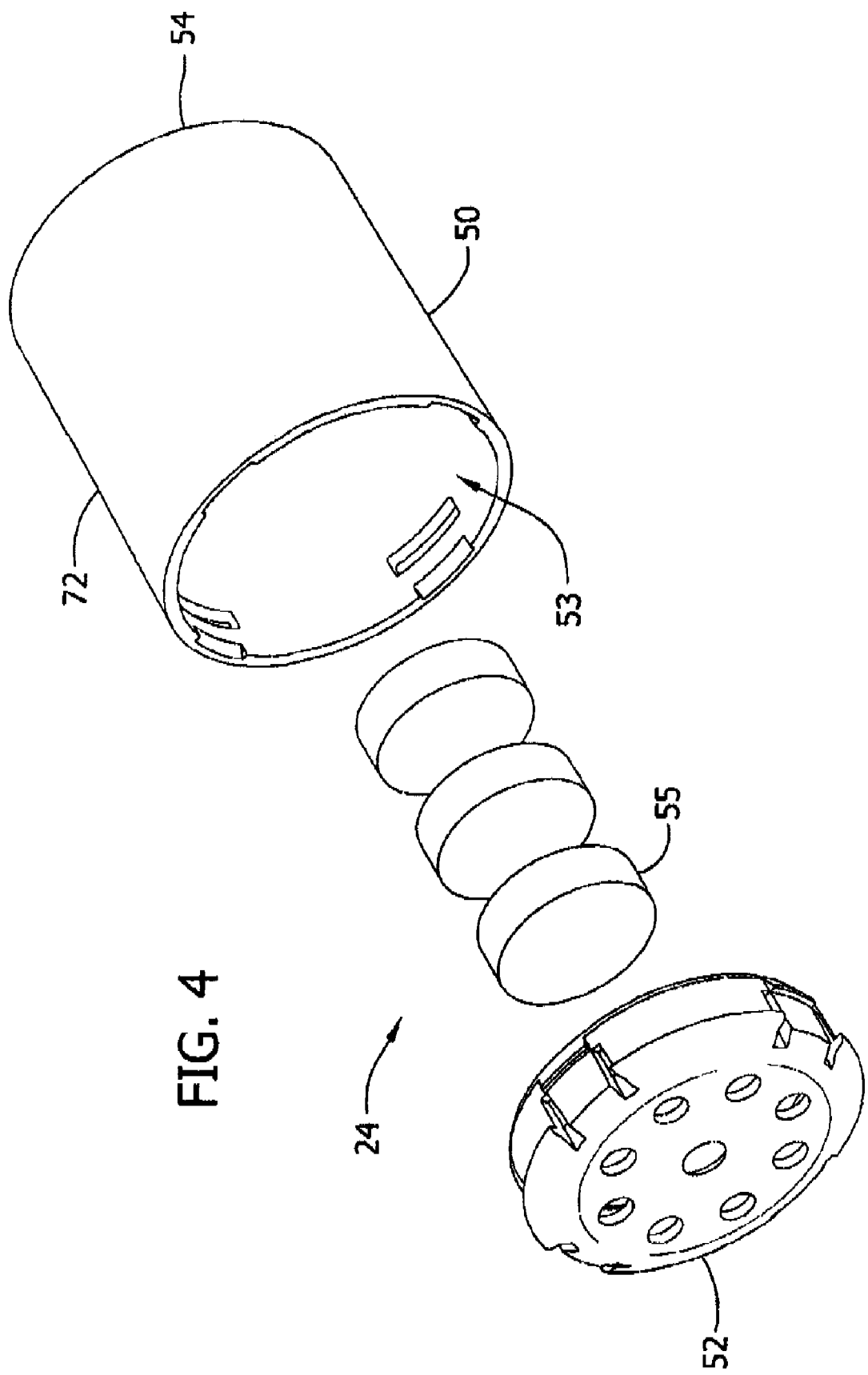
FIG. 4 is an exploded perspective of one embodiment of a monitoring container used in the pest control system of FIG. 1.
Figure 5:
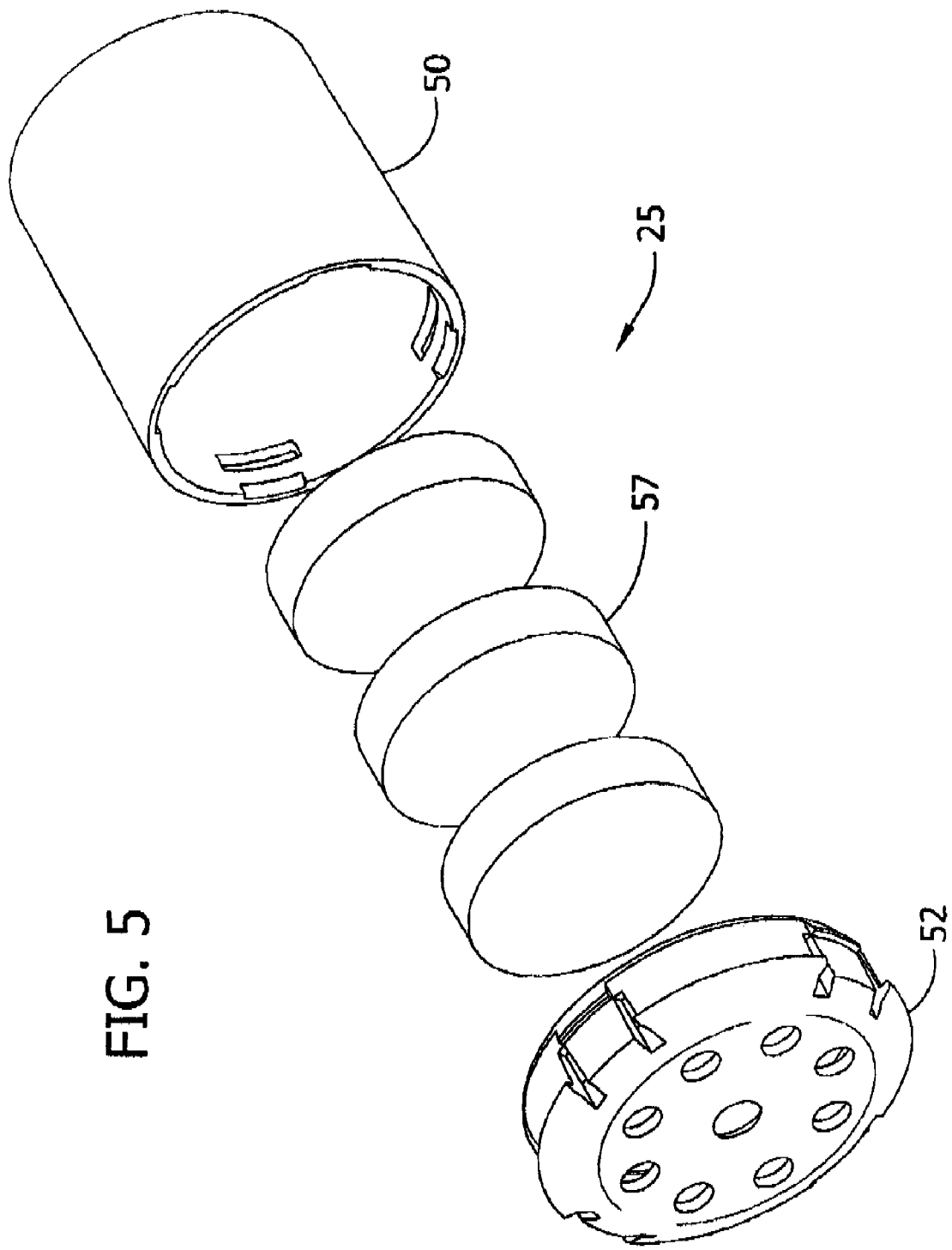
FIG. 5 is an exploded perspective of one embodiment of a bait container similar in construction to the monitoring container of FIG. 4 with bait material placed therein.

Referring now to FIG. 4, the monitoring container 24 in accordance with the illustrated embodiment comprises a cup 50 having a side wall 72 and a closed bottom 54 to thereby define an interior chamber 53 of the container. The cup 50 may also have an accompanying lid 52 or other suitable closure so that the monitoring container 24 is configured as a closed cylinder to complement the configuration of the housing 12. The bottom 54 as used herein is that surface of the container 24 adjacent the aggregation base 22 when the monitoring container 24 is placed in the housing 12 or cavity in an operational fashion. However, it is contemplated that the monitoring container 24 may also be inserted into the system housing 12 or cavity with the lid 52 adjacent the aggregation base 22, or it may inserted such that the side wall 53 of the container is adjacent the aggregation base. An outer transverse cross-sectional dimension (e.g., width, or diameter) of the cup 50 is slightly less than the inner transverse cross-sectional dimension of the housing 12 illustrated in FIG. 2 so that the cup may be removably received within the housing. Referring now to FIG. 5, the bait container 25 is suitably of a construction similar to that of the monitoring container 24 and corresponding parts are indicated by the same reference numerals.

Referring to both FIGS. 4 and 5, a suitable material such as a monitoring material 55 (shown in FIG. 4) that is attractive to termites may be received within the interior chamber 53 of the monitoring container 24. A suitable bait material 57, also sometimes referred to a bait matrix, which is both attractive and toxic to termites may be received within the interior chamber 53 of the bait container 25. The monitoring material 55 and the bait material 57 in one embodiment are suitably in the form of tablets that are easily insertable into the interior chamber 53. It is understood, however, that other monitoring and bait materials, such as in a powder or particulate form, paper or cardboard, wood blocks or chips, other suitable mediums and combinations thereof may be used in the monitoring container 24 and/or bait container 25 without departing from the scope of this invention.

Suitably, the combined length of one container 24 or 25 and the aggregation base 22 when arranged end-to-end within the housing 12 is less than the length of the housing so that the container 24 or 25 can be fully received within the housing 12 in a manner which will not interfere with placement of the cap 28 to cover the top surface 16 of the housing 12. In one particularly suitable embodiment the lid 52 and/or the cup 50 are transparent (or at least partially transparent).

Figure 6:
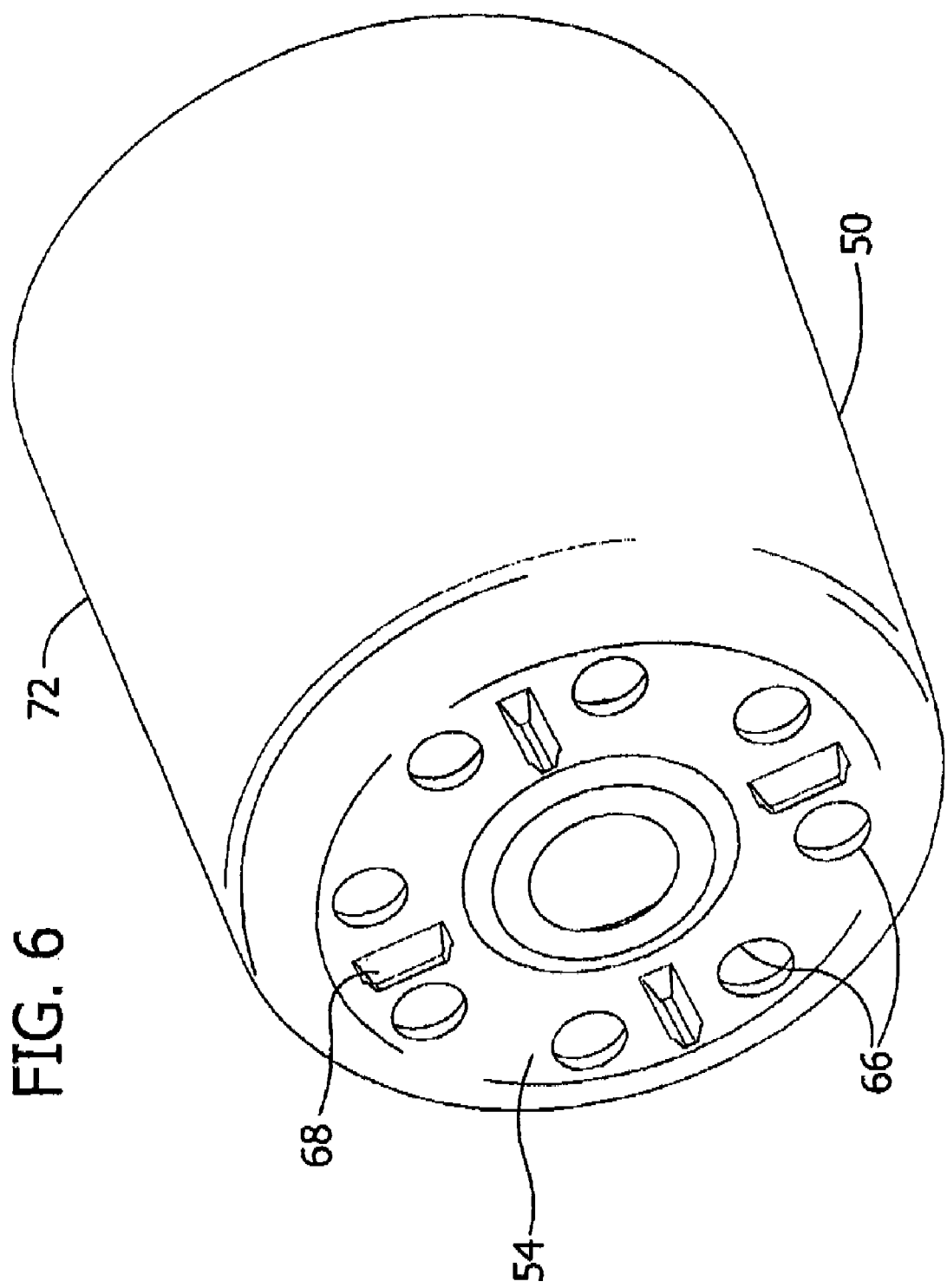
FIG. 6 is a perspective of a cup portion of the monitoring container of FIG. 4.

As shown in FIG. 6, the cup 50 has at least one pest entry opening 66 in its bottom 54 facing the aggregation base 22. The opening 66 in the bottom 54 opens to the interior chamber 53 of the cup 50 when the container 24 or 25 is received in an operational position within the housing 12 thereby allowing the termites to move from the aggregation base 22 to within the interior chamber of the cup. More suitably, multiple such openings 66 may be located in the bottom 54, but a single opening design is also contemplated. For example, the cup 50 may have a single opening 66 with a slightly irregular shape (e.g., cloverleaf shape). In one embodiment as illustrated in FIG. 6, small legs 68 on the bottom 54 of the cup 50 space the cup from the aggregation base 22 to provide a gap for termite exploration. These legs 68 or other spacing members may be omitted, however, without departing from the scope of this invention.

The monitoring container 24 is configured to be removably disposed adjacent the aggregation base 22 (see, e.g., FIG. 2), such that the monitoring container 24 may be removed, inspected and/or replaced without disturbing the aggregation base 22, thereby preserving any aggregation site formed by the termites in the aggregation base 22, such as within the void 42. Similarly, the bait container 25 is configured to be removably received adjacent the aggregation base 22, such that during use, either the monitoring container 24 or the bait container 25 is positioned adjacent the aggregation base.

The lid 52 of the container 24, 25 also may have at least one opening 70 (see FIG. 8), the at least one opening allowing the termites to move into and out of the container through the lid 52 of the container. Additionally, the openings 70 prevent the container 24, 25 from floating if the station 10 or cavity fills with water. Also, if the monitoring material 55 or bait material 57 received within the container 24, 25 becomes water soaked and expands, the openings 66, 70 provide room for expansion, yet keep the bait inside the containers. The side wall 72 of the cup 50 is suitably free of openings so that the termites passing through the openings 37 in the housing 12 are driven down to the aggregation base 22 so that the initial aggregation site is formed in the aggregation base. However, when the cup 50 is used as a monitoring container 24, openings may also be included in the side wall 72. In other embodiments, the bottom 54, side wall 72 and lid 52 of one or both containers 24, 25 may be collectively free from any pest access openings therethrough into the interior chamber 53 so that termites have to eat their way through the container into the interior chamber thereof. It is also contemplated the lid 52 may be omitted so that the top of the container 24, 25 is open, and/or that the bottom 54 may be omitted so that the bottom of the container is entirely open.

Figure 7:
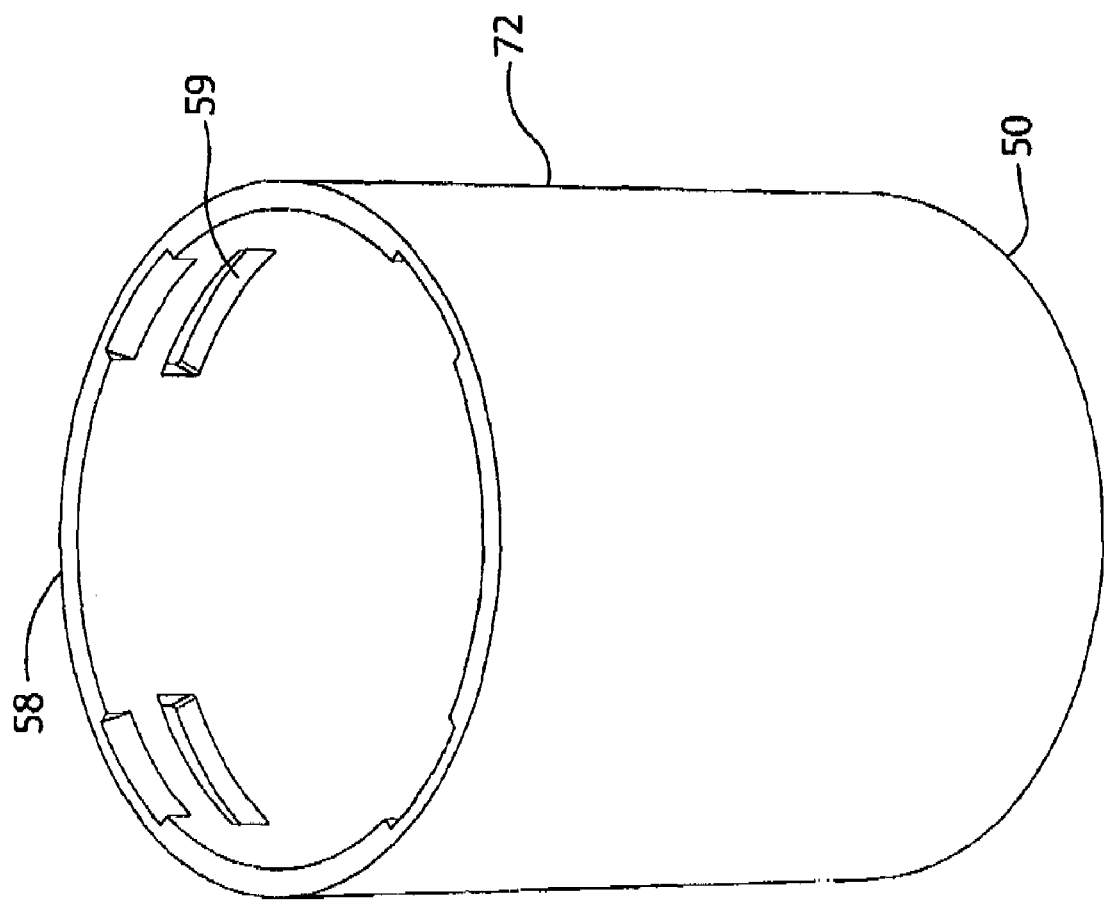
FIG. 7 is another perspective of the cup portion of the monitoring container of FIG. 4.

The lid 52 may be removably secured to the cup 50 using any suitable means. Referring to FIG. 7, in one embodiment, the cup 50 has several recesses 59 near a top rim 58 thereof. FIG. 8 illustrates corresponding flanges 60 on the lid 52 that are received in the recesses 59 to secure the lid 52 to the cup 50. Alternatively a circular threaded portion (not shown) of the cup 50 extends upwardly, and a complementary threaded base portion (not shown) of the lid 52 is removably securable to the cup 50 by screw threads.

In operation according to one embodiment for at least one of monitoring and controlling pests, a subterranean cavity of appropriate dimensions can be made in an area or region of the soil for positioning of the system housing 12 down into the cavity. Typically, the aggregation base 22 and monitoring container 24 are then placed inside the housing 12, and the housing is then inserted or pressed into the cavity until the top surface 16 of the station housing 12 is near the soil surface. However, in some instances, such as when there is a known presence of or conditions conducive for termites, it may be desirable to directly begin using the bait container 25 with the aggregation base 22 and not use a monitoring container 24. Alternatively, the aggregation base 22 is placed directly into the cavity. The container, either 24 or 25, is then placed into the cavity adjacent the aggregation base 22. The description below will describe the aggregation base 22 as being placed within the system housing 12, but it is contemplated that the aggregation base may be placed adjacent to the monitoring container 24 or bait container 25 without the use of a housing 12. Termites locate the housing 12 and the aggregation base 22 as the result of their foraging in search of food sources.

As termites approach the outside of the system 10, they quickly enter through the openings 37 of the housing 12 and move inside to find the aggregation base 22, which is a potential food source. The openings 37 in the housing 12 encourage the termites to quickly pass through the side wall 14 to the aggregation base 22. If the termites enter through the openings 37 and contact the container 24 or 25 above the aggregation base 22, the imperforate sidewall 72 of the container directs the termites down along the elongate openings 37 to the aggregation base 22. The channels 44 encourage the termites to enter the aggregation base 22 and begin to use the internal void 42 created by the base as an aggregation site. The void 42 creates a stopping area in the center for aggregation. Once inside, they will move toward the top of the aggregation base 22 and into the monitoring container 24. Because only the monitoring container 24 is removed to monitor for termite activity, the aggregation base 22 remains undisturbed, thereby maintaining the void 42 of the aggregation base 22 and the aggregation site therein intact.

The system 10 can be inspected periodically for evidence of termite infestation by visually examining the monitoring container 24 for signs of infestation. Inspection of the system 10 can be performed weekly, bi-weekly, monthly, etc. as needed or desired. An inspection is performed by removing the cap 28 and visually inspecting the chamber 53 of the monitoring container 24 or the aggregation base 22 for termite attack. Because of the nature of termite attack against a cellulosic material, such as the monitoring medium 55 or the aggregation base 22, visible signs or evidence of such attack will invariably be left on the monitors. This evidence can include, for example, exploratory tunnels built by termites as they consume the material in such a way that telltale signs of termite infestation are left on the surface of the material and/or mud tubing constructed over and across the interior surface of the station housing 12 or monitoring container 24. Such signs of infestation would be obvious to anyone skilled in the art of termite damage detection. If termite attack is discovered, the system 10 is baited by replacing the monitoring container 24 with a bait container 25. Alternately, the monitoring medium 55 can be removed and replaced with the bait 57. If no termite attack is discovered, the monitoring container 24 is returned to the system housing 12. The cap 28 is replaced and the system 10 is inspected again after the appropriate interval.

Termites consuming the aggregation base 22 will discover and transition to feeding upon the nearby monitoring medium 55 in the monitoring container 24. This can be for one or more reasons. If the monitoring material 55 is of a consistency more preferred by termites than the aggregation base 22, then termites may cease to consume the aggregation base 22 and transition to consuming the monitoring material 55 before the entire aggregation base 22 is consumed. If termites continue to consume the aggregation base 22, the termites will still transition in the normal process of termite foraging to consuming the monitoring material 55 when the aggregation base 22 is entirely consumed. Because the monitoring material 55 is nearby and is of a nature preferably consumed by termites, they invariably begin consuming the monitoring medium.

Once termites have been discovered attacking the monitoring material 55 or aggregation base 22, the system 10 is baited with the toxicant containing bait material 57. Preferably, the monitoring container 24 is removed and replaced with the bait container 25 (with bait material 57 therein). The toxicant-containing bait material according to one suitable embodiment may be in the form of purified cellulose toxicant delivery tablets. One suitable termite bait composition, for example, is described in co-assigned U.S. Pat. No. 6,416,752 entitled "Termite Bait Composition and Method", the disclosure of which is incorporated herein in its entirety by reference.

The toxicant in the bait 57 is preferably of the delayed-action type, or an insect growth regulator, pathogen or metabolic inhibitor. Preferably, it comprises a nontoxic bait composition to which the pesticide toxicant is added. Any suitable termite pesticide composition or other suitably pest control composition may be used in connection with the present invention. In one embodiment, the bait material 57 is in the form of tablets. For example, in one suitable embodiment, the bait 57 comprises at least one compressed tablet having a mass of between about 10 grams (0.35 ounce) and about 45 grams (1.6 ounces), more preferably between about 25 grams (0.88 ounce) and about 40 grams (1.4 ounces), and even more preferably about 35 grams (1.2 ounces).

The removal, inspection and/or replacement of the containers 24, 25 within the housing 12 does not substantially disturb the pre-existing network of access galleries or passageways previously established between the termite colony or nest and the aggregation site in the aggregation base 22 since the base is not displaced during removal and substitution of the container 24, 25. Thus, the disturbance of the aggregation site in the aggregation base 22 is minimized, reducing the likelihood that the termites will abandon the feeding site. Also, communication and access between the pesticide containing container 25 and the termite colony is quickly established upon substitution of the monitoring container 24 with the bait container 25. Foraging termites ingest the pesticide-containing bait 57 and also return portions of the toxic bait to the nest through the pre-existing network of passageways.

The system 10 is inspected at regular intervals (e.g., every 15 to 120 days) to assess the extent of termite consumption of the bait 57. When the bait 57 in the container 25 has been substantially consumed, more bait can be added by removing the lid 52 and inserting more bait in the container 25 or simply by replacing the container with a fresh container. Thus, during normal inspection and/or replacement of containers 24, 25, the aggregation base 22 is not removed and disturbance to the aggregation site is minimized. It may be necessary to periodically replace the aggregation base 22 (e.g., once a year to freshen up the aggregation base 22). This however, is not usually done while termites are actively feeding from the site.

In accordance with one suitable embodiment, at least a portion of the bait container 25 (and additionally, or alternatively, the monitoring container 24) is constructed at least partially of an environmentally degradable plastic, which as used herein refers to a plastic that is subject to degradation in a specific period of time upon exposure to the environment (e.g., water, soil, air, light, etc.). The term environment, as used herein, is intended to refer to the common environment in which the pest control system 10 is normally placed for operation according to its intended function. For example, for pest control systems that are placed in subterranean cavities, such as the system 21 of FIGS. 1-8, the environment includes the surrounding soil, air present in the cavity, and moisture. For above-ground devices the environment includes at least air and may further include light and/or moisture.

An environmentally degradable plastic is intended herein to refer to a biodegradable plastic, a bioerodible plastic, or a combination thereof. A biodegradable plastic refers to a plastic that is capable of undergoing decomposition into carbon dioxide, methane, water, inorganic compounds, or biomass in which the predominant mechanism is the enzymatic action of microorganisms, in a specified period of time. A bioerodible plastic refers to a plastic capable of degrading without the action of microorganisms (also sometimes referred to as abiotic disintegration), at least initially. Such a biodegradation process may include dissolution in water, oxidative embrittlement or UV (e.g., photolytic) embrittlement.

In one particularly suitable embodiment, the environmentally degradable plastic from which the monitoring container 24 and/or bait container 25 may be constructed is an oxo-biodegradable (also referred to as oxo-degradable) plastic, which as used herein refers generally to a two step degradation process in which degradation begins with a chemical degradation process and is followed further by a biological degradation process. For example, in one embodiment the oxo-biodegradable plastic is subject to an oxidation process upon exposure to the environment, such as through photo-oxidation, thermo-oxidation or both (e.g., so that it can degrade in the dark, such as when the monitoring container 24 and/or bait container 25 is disposed within a subterranean cavity), to effectively shorten the polymer chain length of the plastic. By reducing the length of the polymer chain, the plastic is generally embrittled and subject to microfragmentation. As a result, intrinsic microbial accessibility (e.g., to carbon and hydrogen) is increased and the subsequent biodegradation is enabled.

In one embodiment, the oxo-biodegradable plastic is suitably formed by adding a pro-degradant additive to a common polymer from which plastic is made such as, but not limited to, a plastic material classified as a polyolefin, including but not limited to polyvinyl acetate, polyethylene, polypropylene or other suitable plastic, and combinations thereof, to promote and facilitate the oxidation of the plastic such that the plastic is caused to degrade faster than it otherwise would absent the pro-degradant additive. For example, the pro-degradant may reduce the durable life expectancy of the plastic from which the container 24, 25 is constructed by at least about 50 percent compared to the same plastic free from the pro-degradant, more suitably at least about 75 percent, and even more suitably at least about 95 percent.

For example, the pro-degradant may comprise a metal ion pro-degradant or other suitable pro-degradant and remain with the scope of this invention. In other embodiments, one or more additional compositions (i.e., in addition to the pro-degradant)—broadly, biodegradation promoters) may be added to the environmentally degradable plastic to further promote the secondary stage biodegradation. As one particularly suitable example, an oxo-biodegradable masterbatch that may be added to plastic to render it oxo-biodegradable is commercially available from Wells Plastics Limited of Staffordshire, United Kingdom, under the tradename REVERTE. The REVERTE masterbatch includes both a pro-degradant and a biodegradation promoter. It is understood that other suitable additives and/or masterbatches may be used to render the plastic oxo-biodegradable without departing from the scope of this invention.

In another embodiment, a delay modifier, such as an antioxidant, may be added to the plastic along with the pro-degradant to delay the onset of degradation for a generally predetermined period following initial exposure of the monitoring container 24 and/or bait container 25 to the environment. Additionally, or alternatively, a reaction rate modifier may be added to the plastic, along with the pro-degradant to control the timing and triggering of the oxo-degradation.

For example, in one suitable embodiment the environmentally degradable plastic is constructed to be degraded at least about 50 percent by the end of a predetermined time period of less than or equal to about ten years, more suitably about five years, even more suitably about two years, and still more suitably about 1.5 years. More suitably the plastic (and hence the container 24, 25) is constructed to be degraded at least about 75 percent by the end of the predetermined time period, and even more suitably about 95 percent. The degradation of the plastic refers to the reduced durability of the container, or its ability to withstand forces normally incurred by a container in manually grasping the container and lifting it out of the station, and may be compared to the same plastic otherwise free from the pro-degradant added to the plastic.

The degradation may be triggered when the monitoring container 24 and/or bait container 25 is first exposed to the environment, such as when it is initially placed into a system housing 12 that is located in the subterranean cavity, or directly into the subterranean cavity, and slowly degrade over the predetermined time period. Alternatively, the degradation may be delayed or slowed for an initial delay period that is less than the predetermined time period, whereby after the initial delay period the monitoring container 24 and/or bait container 25 degrades more rapidly over the remainder of the predetermined time period. In particularly suitable embodiments the degradation is suitably delayed until a time period close (e.g., with a few months) to the predetermined time period is reached and degradation then occurs quite rapidly.

In one suitable embodiment, a predetermined delay period for initiation or onset of degradation of the monitoring container 24 and/or bait container 25 is within approximately six months of introduction of the material (e.g., the monitor material or the bait material) within the respective container when placed within the natural environment in which it is intended to be used. In another suitable embodiment, the predetermined delay period is more suitably approximately equal to or slightly less than a useful life of the material within the respective container. The predetermined useful life of the material, as used herein, refers to the efficacy of the material or otherwise its ability to perform as intended (e.g., as an attractant, or a toxin, etc.). In particularly suitable embodiments the predetermined useful life of the material is determined by the manufacturer of material, or by the distributor of the system 10 or container 24 and/or 25.

In another particularly suitable embodiment the predetermined time period for degradation of the monitoring container 24 and/or bait container 25 is within approximately six months of the useful life of the material (e.g., the monitor material or the bait material) within the respective container, and is more suitably approximately equal to or less than the useful life of the material within the respective container. In this manner, replacement of the monitoring container 24 (with the monitor material therein) and/or the bait container 25 (with the bait material therein) is encouraged to occur before or about the time that the respective material exceeds its useful life.

It is contemplated that an attractant or other suitable additive (e.g., other than those described previously herein) may be added to the environmentally degradable plastic portion of the container 24, 25 to induce exploration by pests through the container into the interior chamber thereof, and/or to chew through the container to gain access to the interior chamber thereof. For example, a cellulose material, including but not limited to shredded and/or ground plant fibers, extracted and/or purified cellulose (i.e., microcrystalline cellulose), methylcellulose and combinations thereof may be added to the environmentally degradable plastic. As another example, a pheromone may be added to the environmentally degradable plastic. In a particularly suitable example of such an embodiment the pheromone may be a phago-stimulant, e.g., a compound that is released by a pest, such as a termite, that induces gnawing and feeding and leads to the aggregation of additional pests (e.g., termites).

The respective monitoring container 24 and/or bait container 25 may have only a portion thereof that is constructed (at least partially) of an environmentally degradable plastic, or the entire container may be constructed of environmentally degradable plastic. For example, in one suitable embodiment (with reference to the embodiment of FIGS. 1-8) the side wall 72 of the respective container 24, 25 is constructed (at least partially) of an environmentally degradable plastic while the bottom 54 and lid 52 may be constructed of a non-biodegradable plastic or other suitable material. It is understood, however, that the bottom 54 of the container 24, 25 may instead, or additionally be constructed of an environmentally degradable plastic and that the lid 52 of the container may instead, or additionally, be constructed of an environmentally degradable plastic without departing from the scope of this invention. It is also contemplated that one portion of the container 24, 25 may be constructed (at least partially) of an environmentally degradable plastic wile another portion is constructed (at least partially) of a different environmentally degradable plastic.

It is also contemplated that at least a portion of the system housing 12 may instead, or additionally, be constructed (at least partially) of an environmentally degradable plastic. In particular embodiments in which both the system housing 12 and the container 24, 25 are constructed of an environmentally degradable plastic, the system housing is suitably constructed to degrade over a predetermined time period that is substantially longer than the predetermined time period over which the container is intended to degrade.

While in the illustrated embodiments herein the pest control system 10 is in the form of an in-ground or subterranean system, it is understood that the environmentally degradable plastic described herein may be used in an above-ground type pest control system. An example of one suitable above-ground system is disclosed in co-assigned U.S. patent application Ser. No. 11/770,353 entitled Above Ground Termite Station (the entire disclosure of which is incorporated herein) as an above-ground termite station having a housing and a replaceable cartridge that contains both an aggregation member and a bait material. In particular, the cartridge container of such an above-ground station may be constructed at least in part from an environmentally degradable plastic to promote timely replacement of the cartridge.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A method for at least one of monitoring and controlling pests, the method comprising:
    locating a container, having an internal chamber, in an area in which pests are to be at least one of monitored and controlled, at least a portion of the container being constructed from an environmentally degradable plastic constructed to be degraded at least about 50 percent by an end of a predetermined period of time following placement of the container in said area, said container containing at least one of a monitoring material and a bait material within its internal chamber;
    inspecting the container at least once prior to said end of the predetermined time period to determine whether pests are present within the container; and
    replacing the container along with said at least one of the monitoring material and the bait material no later than about six months beyond said end of the predetermined time period following placement of the container in said area, wherein said at least one of the monitoring material and the bait material has a predetermined useful life following placement of the container in said area, said predetermined period of time being within about six months of the predetermined useful life of said at least one of the monitoring material and the bait material.

2. The method set forth in claim 1 wherein the locating step comprises placing the at least a portion of the container in a subterranean cavity.

3. The method set forth in claim 1 further comprising the step of locating a housing in the area in which pests are to be at least one of monitored and controlled, the housing having an internal space and an opening sized to receive the container therethrough for insertion of the container into, and removal of the container from, the internal space of the housing, the step of locating the container comprising placing the at least a portion of the container within the interior space of the housing.

* * * * *